(No Model.)
M. RANDOLPH.
JOURNAL BEARING.
No. 377,049. Patented Jan. 31, 1888.
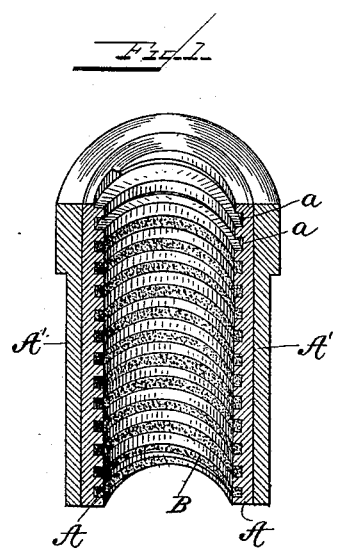
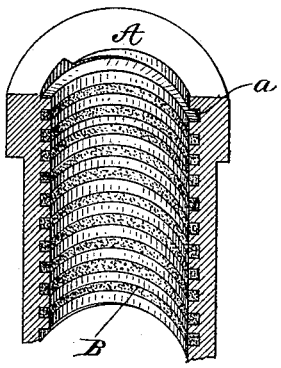
Witnesses
F. L. Durand
D. P. Cowl
Inventor
M. Randolph.

UNITED STATES PATENT OFFICE.

MAHLON RANDOLPH, OF NEW YORK, N. Y.

JOURNAL-BEARING.

SPECIFICATION forming part of Letters Patent No. 377,049, dated January 31, 1888.

Original application filed November 17, 1886, Serial No. 219,141. Divided and this application filed December 15, 1886. Serial No. 221,625. (No model.)

*To all whom it may concern:*

Be it known that I, MAHLON RANDOLPH, of the city, county, and State of New York, have invented certain new and useful Improvements in Anti-Friction Journal-Bearings; and I hereby declare the following to be a full and clear description thereof.

This invention relates to a compound bearing formed partly of vulcanized fiber and partly of an indurated plastic compound in which the lubricating property of graphite or plumbago is used to form a permanent lubricant.

This invention is a part of the original application No. 219,141, filed November 17, 1886, and allowed December 11, 1886, and was withdrawn therefrom by the direction of the Patent Office as embracing a separate invention, and for the purpose of framing the same into this separate application.

The invention will be readily understood by reference to the accompanying drawings, of which—

Figure 1 is a sectional elevation of a spindle, collar, or bearing formed in the manner hereinafter especially described, and inclosed in a metallic case or shell. Fig. 2 is a similar sectional elevational view of the said bearing without a metallic case.

In this form of bearing the body A of the bearing is made of a block of vulcanized fiber and re-entering grooves *a* cut or formed in the wearing-face of said bearing-block A, and into these grooves or interstices is packed or forced a mixture of plumbago with some adhesive substance, as in my Patents Nos. 349,055, 349,056, and 349,057, or a similar mixture in which plumbago forms the lubricating element. This lubricating compound is represented in the drawings by the letter B, and it is put in the said grooves or interstices *a* in a plastic state and is allowed to indurate therein.

The grooves or interstices *a* may be made in the block A in any form best adapted to the particular bearing they are designed for; but that shown in the drawings, being in the form of spiral or diagonal grooves placed obliquely to the peripheral face of the journal or bearing they are designed to act on, is best adapted to most purposes. I claim nothing as to the construction or formation of these diagonal or spirally formed grooves, as they are common in bearings having metallic boxes, and are found in some metallic boxes having similar grooves or interstices filled with a lubricating compound; but the formation of these grooves or pockets in the vulcanized-fiber box A is new, and adapts these bearings to very fine work, such as sewing-machines, electric motors, &c., and also to dynamo-machines and similar structures where lost motion must be prevented and the journal-bearing maintained in a position coaxial with the other operative parts of the mechanism. In such places the vulcanized fiber acts to form a durable and perfectly reliable anti-friction bearing, whereas in such cases the metallic box or bearing would not.

In some cases the entire shell of the bearing may be formed of the vulcanized fiber, as in Fig. 2, or this shell may be made in the form of a bushing, which is inclosed in the metallic shell A', as in Fig. 1.

Having described my invention, I claim—

An anti-friction journal or machine bearing formed of vulcanized fiber, and lubricating material composed of plumbago and an adhesive cement, placed in grooves or pockets formed in the said vulcanized fiber, substantially as described.

MAHLON RANDOLPH.

Witnesses:
HENRY CALVER,
J. S. BARKER.